US012369596B2

(12) United States Patent
Luck et al.

(10) Patent No.: US 12,369,596 B2
(45) Date of Patent: Jul. 29, 2025

(54) PRE-LYOPHILIZATION THERMALLY CONDUCTIVE ENVELOPMENT AND DIMENSIONAL HOMOGENIZATION OF THERMALLY SOLID BIOLOGICAL FLUIDS

(71) Applicant: MILKIFY, INC., Houston, TX (US)

(72) Inventors: Berkley Kristina Johnson Luck, Houston, TX (US); Pedro Rossi Silva, Houston, TX (US)

(73) Assignee: MILKIFY, INC., Houston, TX (US)

( * ) Notice: Subject to any disclaimer, the term of this patent is extended or adjusted under 35 U.S.C. 154(b) by 0 days.

(21) Appl. No.: 18/691,409

(22) PCT Filed: Sep. 7, 2022

(86) PCT No.: PCT/US2022/076033
§ 371 (c)(1),
(2) Date: Mar. 12, 2024

(87) PCT Pub. No.: WO2023/076761
PCT Pub. Date: May 4, 2023

(65) Prior Publication Data
US 2024/0268401 A1 Aug. 15, 2024

Related U.S. Application Data

(60) Provisional application No. 63/263,218, filed on Oct. 28, 2021.

(51) Int. Cl.
*A23C 3/05* (2006.01)
*A23B 11/145* (2025.01)
(Continued)

(52) U.S. Cl.
CPC .......... *A23B 11/1455* (2025.01); *A23C 9/206* (2013.01); *B32B 15/085* (2013.01);
(Continued)

(58) Field of Classification Search
CPC .. A23C 1/06; A23C 1/08; A23C 3/055; A23C 7/04; A23C 9/18; A23C 9/20;
(Continued)

(56) References Cited

U.S. PATENT DOCUMENTS 3,324,565 A * 6/1967 Smith, Jr. ................ F26B 5/06
34/92
3,394,469 A 7/1968 Rembs et al.
(Continued)

FOREIGN PATENT DOCUMENTS

DE 4206705 A1 9/1993
EP 0913656 A1 5/1999
(Continued)

OTHER PUBLICATIONS

Chapter II Demand in related International Application No. PCT/US2022/076033, dated Jul. 21, 2023, 28 pages.
(Continued)

*Primary Examiner* — Erik Kashnikow
*Assistant Examiner* — Bryan Kim
(74) *Attorney, Agent, or Firm* — Thompson Patent Law Offices PC (57) ABSTRACT

Apparatus and associated methods relate to lyophilizing a solid phase composition (SPC). In an illustrative example, the SPC is received in a frozen state in a first packaging. The SPC may be, for example, transferred into a second packaging having a thermally conductive layer, mechanically distributed to a predetermined maximum thickness to form a block having at least one homogenous dimension, and provided with a heat source configured to communicate substantially all thermal energy to the SPC via the thermally conductive second layer. In some embodiments, the SPC may be maintained in the frozen state. For example, the lyophilized SPC may be transferred to a third packaging.
(Continued)

Various embodiments may limit physical contacts with the SPC to the first packaging, the second packaging, and the third packaging. Various embodiments may advantageously maintain sanitation, retain nutrients of the SPC, and/or promote consistent results from the lyophilization process.

22 Claims, 7 Drawing Sheets

(51) Int. Cl.
*A23C 9/20* (2006.01)
*B32B 15/085* (2006.01)
*B32B 15/20* (2006.01)
*B32B 27/32* (2006.01)
*B65D 75/26* (2006.01)

(52) U.S. Cl.
CPC .............. *B32B 15/20* (2013.01); *B32B 27/32* (2013.01); *B65D 75/26* (2013.01); *B32B 2250/02* (2013.01); *B32B 2307/302* (2013.01); *B32B 2439/70* (2013.01)

(58) Field of Classification Search
CPC ........ A23C 9/203; A23C 9/206; A61K 35/20; A23B 2/8033; A23B 2/8055; A23B 2/90; A23B 2/92; A23B 11/00; A23B 11/10; A23B 11/145; A23B 11/1455; A23B 11/102; A23B 11/12; A23B 11/123; A23B 11/127; A23B 11/13; A23B 11/1303; A23B 11/133; A23B 11/1332; A23B 11/1334; A23B 11/1336; A23B 11/14; A23B 11/1403
See application file for complete search history.

(56) References Cited

U.S. PATENT DOCUMENTS

| | | | |
|---|---|---|---|
| 3,571,940 | A | 3/1971 | Bender |
| 4,565,073 | A | 1/1986 | Lavender |
| 5,084,040 | A | 1/1992 | Sutter |
| 8,053,248 | B2 | 11/2011 | Bakaltcheva et al. |
| 8,459,503 | B2 | 6/2013 | Groesbeck |
| 9,863,699 | B2 | 1/2018 | Corbin, III et al. |
| 2007/0071855 | A1* | 3/2007 | Kanzaki ............. B65D 81/3461 426/107 |
| 2015/0122793 | A1* | 5/2015 | Takizawa ................ A23L 3/365 219/255 |
| 2017/0336141 | A1 | 11/2017 | Schuetz et al. |
| 2020/0146931 | A1* | 5/2020 | Doty ....................... F26B 9/066 |

FOREIGN PATENT DOCUMENTS

| | | |
|---|---|---|
| WO | 2010033169 A1 | 3/2010 |
| WO | 2015191599 A2 | 12/2015 |
| WO | 2015191599 A3 | 12/2015 |
| WO | 2020243791 A1 | 12/2020 |
| WO | 2021003575 A1 | 1/2021 |
| WO | 2023076761 A1 | 5/2023 |

OTHER PUBLICATIONS

Huang, et al, Temperature-sensitive membranes prepared by the plasma-induced graft polymerization of N-Isopropylacrylamide into porous polyethylene membranes, Journal of Applied Polymer Science, Jun. 30, 2023, https://onlinelibrary.wiley.com/doi/10.1002/app.12562.

International Preliminary Report on Patentability in related International Application No. PCT/US2022/076033, dated Feb. 21, 2024, 7 pages.

International Search Report and Written Opinion of the International Searching Authority in related International Application No. PCT/US2022/076033, dated Dec. 19, 2022, 10 pages.

Liu, et al., Temperature-sensitive porous membrane production through radiation co-grafting of NIPAAm on/in PVDF porous membrane, Radiation Physics and Chemistry, vol. 76, Issue 4, Apr. 2007, pp. 707-713, accessed Jul. 12, 2022, https://doi.org/10.1016/j.radphyschem.2006.03.005.

Response to Written Opinion in related International Application No. PCT/US2022/076033, dated Sep. 22, 2023, 3 pages.

Schindelholz, et al, An Evaluation of Supercritical Drying and PEG/Freeze Drying of Waterlogged Archaeological Wood, National Center for Preservation Technology and Training Grant MT-2210-05-NC-10, The Mariners' Museum, 2007-04, https://www.nps.gov/subjects/ncptt/upload/2007-04.pdf.

Written Opinion of the International Searching Authority in related International Application No. PCT/US2022/076033, dated Aug. 31, 2023, 6 pages.

* cited by examiner

PRE-LYOPHILIZATION THERMALLY CONDUCTIVE ENVELOPMENT AND DIMENSIONAL HOMOGENIZATION OF THERMALLY SOLID BIOLOGICAL FLUIDS

CROSS-REFERENCE TO RELATED APPLICATIONS

This application claims the benefit of PCT application No. PCT/US2022/076033, titled "Pre-Lyophilization Thermally Conductive Envelopment and Dimensional Homogenization of Thermally Solid Biological Fluids," filed by Luck, et al. on Sep. 7, 2022, which claims the benefit of U.S. Provisional Application Ser. No. 63/263,218, titled "Pre-Lyophilization Thermally Conductive Envelopment and Dimensional Homogenization of Thermally Solid Biological Fluids," filed by Luck, et al., on Oct. 28, 2021.

This application incorporates the entire contents of the foregoing application(s) herein by reference.

TECHNICAL FIELD

Various embodiments relate generally to lyophilization of thermally solid fluids.

BACKGROUND

Lyophilization, sometimes also known as freeze drying, is a low temperature dehydration process. For example, a product to be lyophilized may be frozen and be exposed under low pressure. For example, water or ice within the product may be removed by sublimation. Because of the low temperature used in processing, when the lyophilized product is a food product, lyophilization may advantageously preserve nutrients of the food product after rehydration. Some applications of freeze drying include biological (e.g., bacteria and yeasts), biomedical (e.g., surgical transplants), food processing (e.g., coffee), and food preservation.

Various foods may be lyophilized. For example, seasonal fruits and vegetables may be lyophilized to preserve their color, taste, and aroma. For example, coffee may be lyophilized for the military and/or long distance hikers. For example, insects may also be lyophilized for, sometimes, sold as exotic pet food, bird feed, fish bait, and/or human consumption. In some examples, fluid may also be lyophilized while being transformed (e.g., by freezing) to a thermally solid state.

Due to the low processing temperatures and rapid removal of water through sublimation in lyophilization, deterioration reactions in a lyophilized food (e.g., non-enzymic browning, enzymatic browning, and protein denaturation) may advantageously be minimized. When a food product is successfully lyophilized and packaged properly, for example, the lyophilized food product may have a shelf life of greater than 12 months. In some examples, lyophilized foods may also be advantageously easily re-hydrated to be served. Since a common method of microbial decontamination for freeze drying is the low temperature dehydration process, spoilage organisms and pathogens resistant to these conditions can remain in the product. Although microbial growth is inhibited by the low moisture conditions, it can still survive in the food product. Therefore, food safety may be a high priority for food lyophilization manufacturers.

SUMMARY

Apparatus and associated methods relate to lyophilizing a solid phase composition (SPC). In an illustrative example, the SPC is received in a frozen state in a first packaging. The SPC may be, for example, transferred into a second packaging having a thermally conductive layer, mechanically distributed to a predetermined maximum thickness to form a block having at least one homogenous dimension, and provided with a heat source configured to communicate substantially all thermal energy to the SPC via the thermally conductive second layer. In some embodiments, the SPC may be maintained in the frozen state. For example, the lyophilized SPC may be transferred to a third packaging. Various embodiments may limit physical contacts with the SPC to the first packaging, the second packaging, and the third packaging. Various embodiments may advantageously maintain sanitation, retain nutrients of the SPC, and/or promote consistent results from the lyophilization process.

Various embodiments may achieve one or more advantages. For example, some embodiments may be directed to channeling water vapor effectively. In some examples, some embodiments may be directed to preserving metadata of the SPC. In some examples, some embodiments may be directed to preserve a contact free process.

The details of various embodiments are set forth in the accompanying drawings and the description below. Other features and advantages will be apparent from the description and drawings, and from the claims.

BRIEF DESCRIPTION OF THE DRAWINGS

FIG. 3 is a flowchart to illustrate an exemplary method of lyophilizing a solid phase composition.

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, an illustrative use-case scenario of an exemplary thermally solid fluids lyophilization process is introduced with reference to FIG. 1. Second, that introduction leads into a description with reference to FIGS. 2-3 of some exemplary embodiments of a pre-lyophilization process of thermally solid biological fluids. Third, with reference to FIG. 4, the discussion turns to exemplary embodiments that illustrate an exemplary thermally conductive envelope during a lyophilization process. Fourth, and with reference to FIG. 5, this disclosure turns to a review and discussion of a thermal response of a SPC within an exemplary thermally conductive envelope during a lyophilization process.

Finally, the document discusses further embodiments, exemplary applications and aspects relating to lyophilization of thermally solid fluids.

Figure 1:
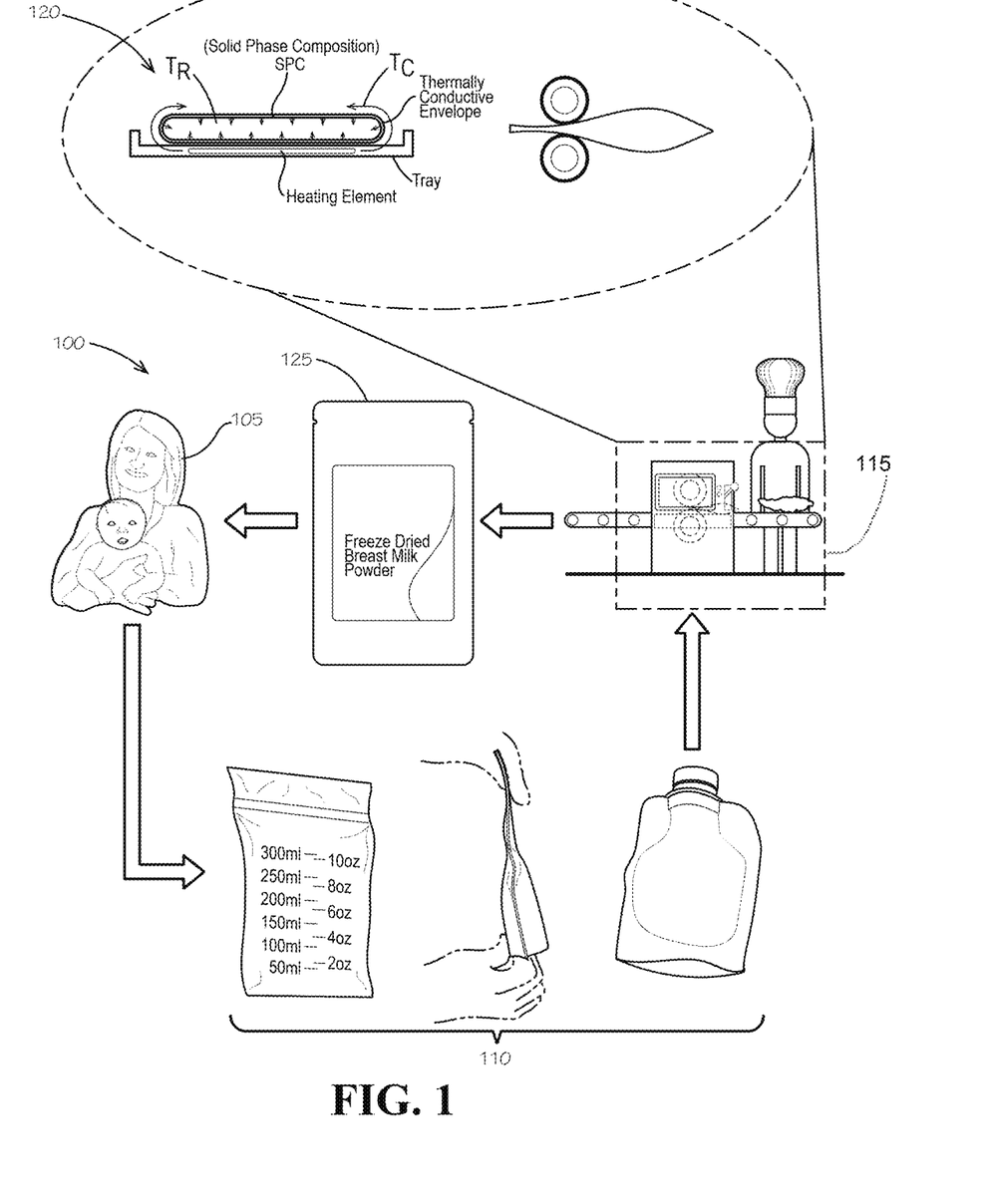
FIG. 1 depicts an exemplary thermally solid biological fluid lyophilization process employed in an illustrative use-case scenario.

FIG. 1 depicts an exemplary thermally solid biological fluid lyophilization process 100 employed in an illustrative use-case scenario. In this example, a user 105 sends a biological fluid 110 to a processing facility 115. As an illustrative example without limitation, the user 105 may be a mother wishing to receive freeze-dried breast milk powder by sending samples of breast milk. As an example, and not limitation, the biological fluid 110 may be frozen breast milk. For example, the freeze-dried breast milk powder may advantageously preserve nutrients longer than frozen breast milk, store without refrigeration for 3 years or longer, transport more easily, and take up less space for storage.

In some examples, the biological fluid 110 was contained in special purpose packaging designed to contain the biological fluid 110. For example, the packaging may be provided by the user 105. In some implementations, various shapes and sizes of the packaging of the biological fluid 110 may be used.

The processing facility 115 receives the biological fluid 110 for lyophilization. Due to the various shapes and sizes of the packaging, in various embodiments, the processing facility 115 may process the biological fluid 110 with various pre-lyophilization steps 120 before lyophilizing the thermally solid biological fluid 110. In various embodiments, the pre-lyophilization steps 120 may advantageously improve efficiency and sanitization of the lyophilization process 100. After the lyophilization process 100, the processing facility 115 sends back lyophilized end-product 125 to the user 105. For example, the user 105 may receive a freeze-dried breast milk powder for future use. In various implementations, the end-product 125 may be produced while the biological fluid 110 is maintained in a thermally solid state. In some implementations, the lyophilized end-product 125 may include, on the packaging, metadata information related to the thermally solid biological fluid 110. For example, the metadata may include a date of expression, a time of expression, dietary information prior to expression, and/or medications, vaccines, sickness, or other relevant factors during expression.

Various embodiments may advantageously enable a contact-free process for lyophilizing and packaging biological fluid 110 (e.g., human breast milk). Accordingly, various embodiments may advantageously reduce risk of contamination. For example, various embodiments may advantageously maintain each sample (e.g., from each mother) isolated from processing equipment and/or workers. Various embodiments may advantageously maintain each sample isolated from other samples (e.g., from other mothers). Accordingly, various embodiments may, for example, advantageously prevent disease, illness, and or death of persons (e.g., infants) receiving (e.g., consuming) the lyophilized biological fluid.

Figure 2:
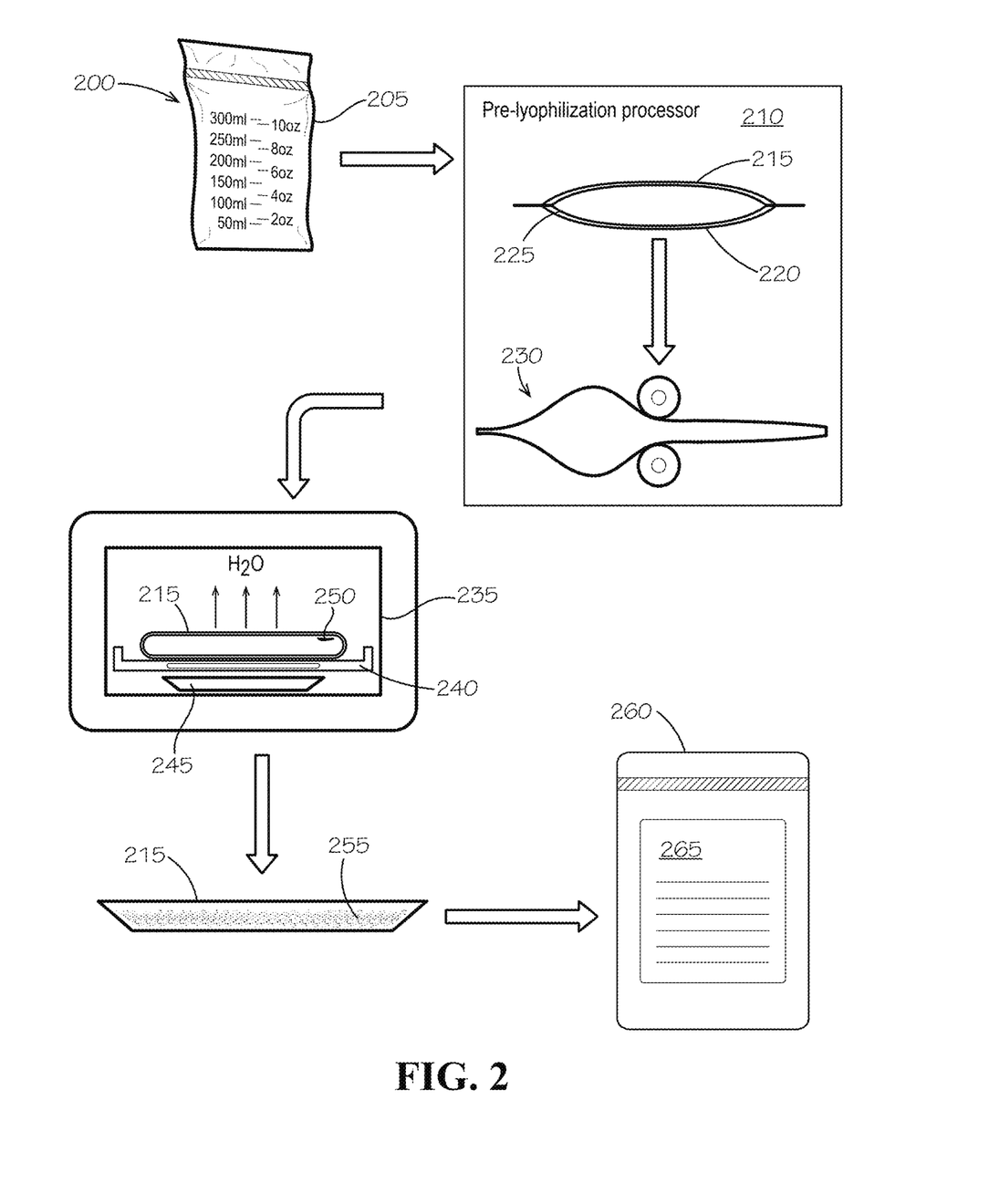
FIG. 2 shows an exemplary process for thermally solid biological fluids lyophilization.

FIG. 2 shows an exemplary process 200 for thermally solid biological fluids lyophilization. In the depicted example, a fluid package 205 containing biological fluids in an at least partially frozen state for lyophilization is sent. For example, a frozen breast milk may be sent in lactation bags of various sizes by various users. In some implementations, the process 200 may use a dedicated service provider to ensure the quality of the thermally solid biological fluids was maintained during transportation. As an example, without limitation, the dedicated service provider may be required to ensure that the thermally solid biological fluids are transported in a frozen state at all times.

As shown in FIG. 2, the fluid package 205 is received and processed by a pre-lyophilization processor 210. For example, the pre-lyophilization processor 210 may include steps to facilitate the lyophilization process and improve the quality of the end-product after the lyophilization process. In some implementations, each of the received fluid package 205 may be weighed at intake. In some implementations, metadata of the received fluid package 205 may be recorded in a database. For example, the recorded metadata may be printed onto a final product packaging for sending back to the user.

In some examples, the fluid package 205 includes solid phase composition (SPC). In this example, the SPC contained in the fluid package 205 is transferred under a sterile hood (not shown) into a thermally conductive envelope 215. In some implementations, the pre-lyophilization processor 210 may transfer the fluid package 205 into different sizes of the thermally conductive envelope 215. For example, the pre-lyophilization processor 210 may transfer the fluid packages 205 weighing less than 6 oz. at intake into a small thermally conductive envelope. In some examples, the pre-lyophilization processor 210 may transfer the packages 205 weighing more than 6 oz. at intake into a large thermally conductive envelope. In various embodiments, transferring the SPC into an appropriate size of thermally conductive envelope may advantageously improve efficiency and quality of the lyophilization process.

In the depicted example, the thermally conductive envelope 215 includes an outer layer 220 and an inner layer 225. For example, the inner layer 225 may be a food-safe layer that is sterile to safely contain the SPC. The outer layer 220, for example, may be a thermally conductive layer. The inner layer 225 may, in some implementations, include a polymer (e.g., polypropylene). For example, the inner layer 225 may be a material approved by the U.S. Food and Drug Administration for containing the thermally solid biological fluid.

In some implementations, the outer layer 220 may, for example, include aluminum. In other implementations, the outer layer 220 may include other thermally conductive material. For example, the outer layer 220 may include graphite. In other examples, the outer layer 220 may include copper. In some examples, the outer layer 220 may be a thermally conductive alloy.

In various embodiments, the thermally conductive outer layer 220 encompasses full or part of the thermally conductive envelope 215. In one example, the outer layer 220 may cover all surface area of the thermally conductive envelope 215. In some examples, the outer layer 220 may cover at least 80% of a total surface area of the block.

After the biological fluid is transferred into the thermally conductive envelope 215, for example, the frozen fluid may undergo a mechanical process 230 to be distributed to a predetermined maximum height in a first dimension. In some implementations, the frozen fluid may be rolled, flattened (e.g., by plates), cut, broken, or some combination thereof. As a result, the frozen fluid may be formed into a block having at least one homogenous dimension (e.g., thickness), for example. In some implementations, the thermally conductive envelope 215 may be physically flattened to a thickness of ½ inch while the fluid is maintained in a frozen state. In some examples, the thermally conductive envelope 215 may be further mechanically formed into a substantially uniform predetermined volume (e.g., maximum width and/or length). For example, the SPC may be formed into a predetermined maximum thickness block while preserving the fluid in the frozen state. In various embodiments, maintaining the fluid in the frozen state may advantageously maintain sanitation and/or nutrient levels of the fluid. In some examples, forming the fluid into a dimensionally homogenous block (in at least one dimension) may advantageously promote consistent lyophilization. Accordingly, various embodiments may advantageously receive pre-frozen biological fluid in a diverse array of disparate packaging and transform the SPC into a standardized package to achieve processing efficiencies while maintaining the contents in a frozen state.

As shown in FIG. 2, the thermally conductive envelope 215 is loaded into a freeze-dryer 235 after being processed by the pre-lyophilization processor 210. For example, the freeze-dryer 235 may be a shelf lyophilizer that allows users to freeze dry a variety of substances including meats, fruits, vegetables, dairy products, and other dietary substances. In one example, food may be put on a stainless-steel tray and be processed for a period of time (e.g., 48 hours). After processing, the food may become freeze-dried in which water is removed from the food through sublimation, for example. In some examples, the freeze-dried food may preserve its nutrients for a longer period of time.

In this example, the freeze-dryer 235 includes a tray 240 containing the thermally conductive envelope 215 a heating element 245. The thermally conductive envelope 215, as shown in FIG. 2, includes at least one opening 250 at one end. In some examples, the opening 250 may allow water vapor to escape from the thermally conductive envelope 215 during lyophilization. In some implementations, the opening 250 may not be a hole or be cut open. For example, the opening 250 may be an area of the envelope 215 that is constructed to be permeable to water vapor but impermeable to the fluid inside.

After the lyophilization process, the fluid inside the thermal conductive envelope 215 becomes powder 255. In this example, the powder is transferred to an out-going package 260. As shown, the recorded metadata, previously stored when the fluid packages 205 is received. is printed as a label 265 onto the out-going package 260. For example, the out-going package may be sent back to a sender of the fluid package 205. According to various embodiments, the powder may be manufactured without direct contact with humans and/or equipment to advantageously maintain sanitization and reduce contamination to the powder.

FIG. 3 is a flowchart to illustrate exemplary method 300 of lyophilizing a solid phase composition (SPC). For example, the processing facility 115 may perform the method 300 to lyophilize a thermally solid biological fluid into powder.

The method 300 starts when the processing facility 115 receives the SPC in a frozen state in a first packaging in step 305. For example, the processing facility 115 may receive the SPC in packaging of various sizes. In step 310, it is determined whether the received first packaging is big. For example, the first packaging may be compared to a pre-determined threshold in various dimensions. For example, the first packaging may be compared to a pre-determined threshold in weight. If it is determined that the received first packaging is big, then a large second packaging is selected in step 315. Otherwise, if it is determined that the received first packaging is small, then a small second packaging is selected in step 320.

Next, while maintaining the SPC in the frozen state, in step 325, the processing facility transfers the SPC into the selected second packaging having a thermally conductive layer. For example, the thermally conductive layer may encompass at least 80 percent of a total surface area of the SPC. In step 330, the SPC is mechanically distributed to a predetermined maximum thickness to form a block having at least one homogenous dimension. For example, the SPC in the second packaging may be rolled, flattened, or some combination thereof into a predetermined height. In some implementations, a uniform thickness of the second packaging may advantageously maintain consistent results for lyophilization.

In a decision point 332, it is determined whether the SPC (e.g., in a frozen block) exceed a predetermined length (e.g., and/or width) threshold. For example, the threshold may be determined based on vapor quantities generated during lyophilization. The threshold may be selected to achieve a desired maximum distance to a vapor escape route through the SPC. If no, the method proceeds to a step 335. If yes, then venting channels are formed in the SPC. For example, the venting channels may be formed by breaking the SPC along a transverse axis (e.g., across a width of the block). The venting channels may, for example, be formed entirely through a thickness of the SPC. In some implementations, the venting channels may be formed, by way of example and not limitation, automatically (e.g., by a pressing member and an anvil). In some implementations, for example, the venting channels may be formed by bending the SPC past a yield strength and/or ultimate tensile strength.

In step 335, the processing facility provides a heat source configured to communicate substantially all thermal energy to the SPC via the thermally conductive second layer. For example, the SPC may be lyophilized by the end of the method 300.

Figure 4:
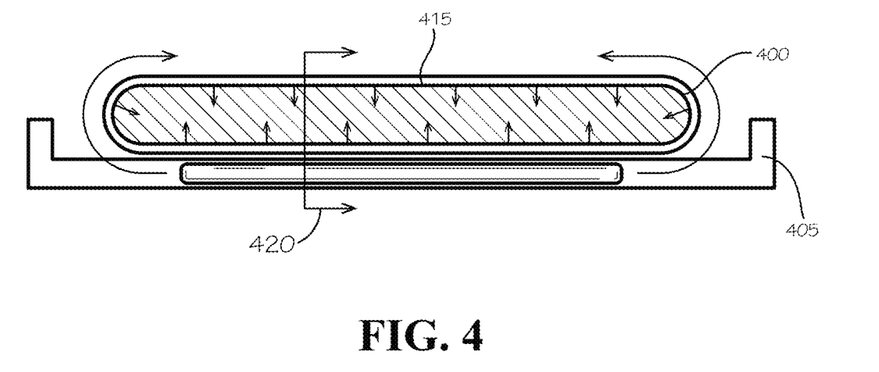
FIG. 4 shows an exemplary thermally conductive envelope during a lyophilization process.

FIG. 4 shows an exemplary thermally conductive envelope 400 during a lyophilization process. For example, the thermally conductive envelope 400 may be placed in the freeze-dryer 235 for lyophilization. In this example, the thermally conductive envelope 400 is placed on a tray 405. The tray 405 includes a heating element 410 for providing thermal energy in the lyophilization process of a SPC 415 in the thermally conductive envelope 400.

During a lyophilization process, in some implementations, the heating element 410 may from time to time provide heat to the SPC 415 to sublimate under reduced pressure. In this example, thermal energy is transferred to the SPC, as shown in FIG. 4 as TR. Due to the thermally conductive nature of the envelope 400, thermal energy is transferred by thermal conduction throughout the surface of the thermal conductive envelope as shown in FIG. 4 as Tc. For example, the thermally conductive layer may conduct heat from the heat element 410 to substantially surround the block. In some implementations, the thermally conductive envelope may conduct the heat from the heating element 410 such that a temperature surrounding a surface of the SPC may be substantially uniform. In various embodiments, the thermal conductivity of the thermal conductive envelope 400 may, for example, advantageously improve lyophilization consistency and/or speed. In some implementations, during a heating phase, a temperature change or heat flux along a line between a point from the heating element side of the SPC to a point of shortest distance at the top side of the SPC 415 may be at least partially governed by the Fourier's law for heat conduction.

Figure 5:
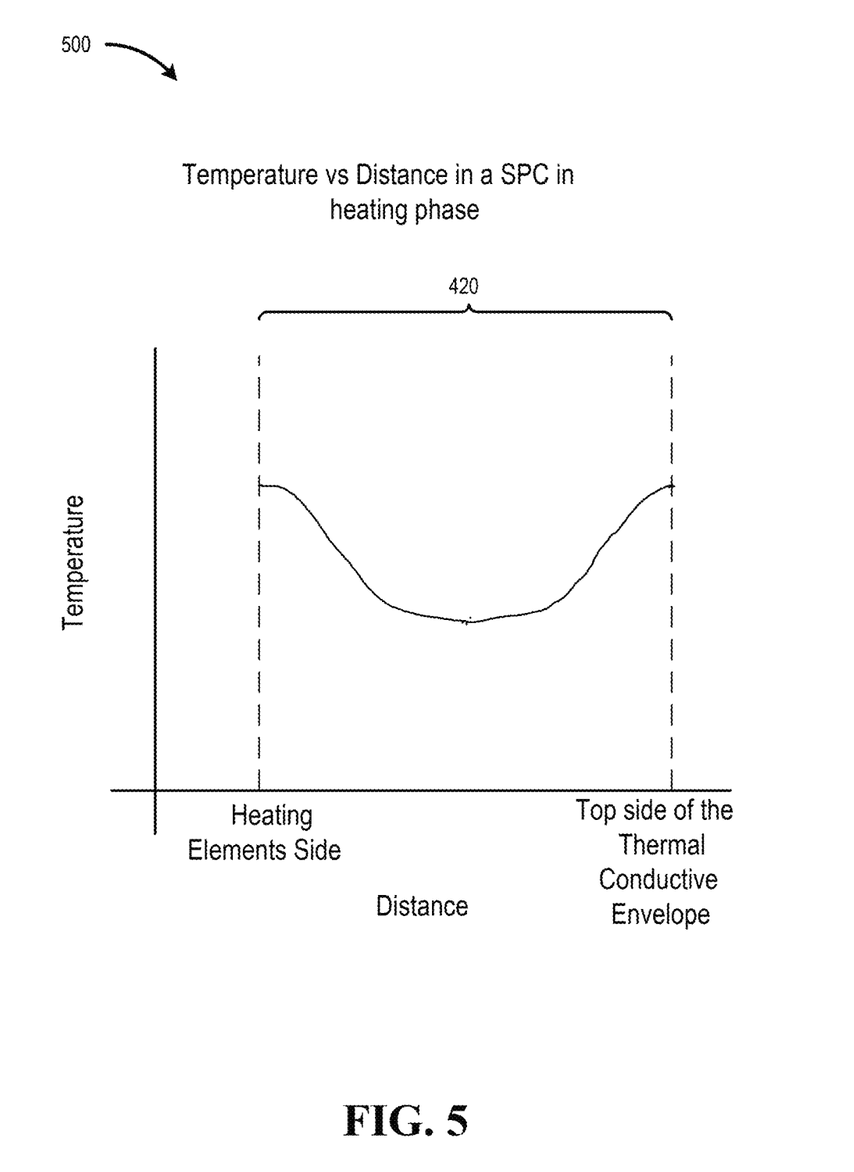
FIG. 5 illustrates a thermal response of a solid phase composition along a line from a heating element side to a top side of an exemplary thermally conductive envelope during a heating phase of a lyophilization process.

FIG. 5 illustrates a thermal response of a SPC along a line from a heating element side to a top side of an exemplary thermally conductive envelope during a heating phase of a lyophilization process. In some embodiments, the SPC may have a thermal resistance $R_{th}$ governed by the following equation:

$$R_{th} = \frac{x}{A * k}$$

Where $R_{th}$ is the absolute thermal resistance across the SPC, x is the distance between two points in the SPC (e.g., a distance of the line 420 representing, for example, a thickness of the block of SPC), k is the thermal conductivity of the material, and A is the cross-sectional area (perpendicular to the path of heat flow). In this example plot 500, the illustrated direction the heat flow may be directed along the heating element 410 towards the top side of the thermal conductive envelope 400. In various examples, because the thermally conductive envelope 400 has very low thermal resistance, the thermal conductive envelope may have substantially equal temperature throughout the surface of the envelope 400. In some examples, during a heating phase of the lyophilization process, the thermal conductive envelope 400 may apply heat evenly towards a surface of the SPC.

Given the thermal resistance $R_{th}$ across the SPC, the amount of heat transferred through the SPC may be calculated, by way of example and not limitation, using the following equation:

$$R_{th} = \frac{\Delta T}{\dot{Q}}$$

Where $\Delta T = T_1 - T_2$ and Q is the amount of heat energy transferred per unit time from the thermal conductive envelope to the SPC.

In various embodiments, $R_{th}$ of different thermal conductive envelopes in the freeze-dryer may be substantially made equivalent. For example, the pre-lyophilization processor 210 may mechanically distribute each SPC to a predetermined maximum height, thereby fixing the distance or length of the line 420. In various embodiments, a lyophilization process may advantageously be made consistent with the homogenous dimension of the SPC.

As shown in a predictive example in FIG. 5, during a heating phase, heat may be applied to the SPC from both a heating element side of the SPC and at a top side of the thermally conductive envelope. As a result of the high thermal conductivity of the thermally conductive envelope, the temperature between the two end points of the line 420 is substantially at a similar level. As shown, the thermally conductive envelope conducts heat around the SPC such that temperature is applied substantially symmetrically towards a center of the line 420. In some examples, the SPC may advantageously be lyophilized at both sides while both sides are maintained in a substantially frozen state.

In some embodiments, external heat may be applied to more than one side. For example, a first heating element may be disposed below the SPC (e.g., as shown in FIG. 4). A heating element may, for example, be disposed above the SPC (e.g., a second heating element). In some embodiments, one or more heating elements may, by way of example and not limitation, be disposed adjacent to one or more edges of the SPC.

In various embodiments, a heating element may, for example, be embedded in a tray or other structure (e.g., as depicted in FIG. 4). In some embodiments, a heating element may, for example, be disposed between a tray (e.g., the tray of FIG. 4) and a support member (e.g., a rack such as a wire rack) supporting the SPC in the thermally conductive envelope. In some embodiments, a heating element may, for example, be disposed such that a tray (e.g., the tray of FIG. 4) is disposed between the heating element and the SPC. In some embodiments, a heating element(s) may be disposed around a perimeter of a chamber and/or disposed outside of a chamber (e.g., heating an intermediary substance, such as a fluid).

Figure 6A:
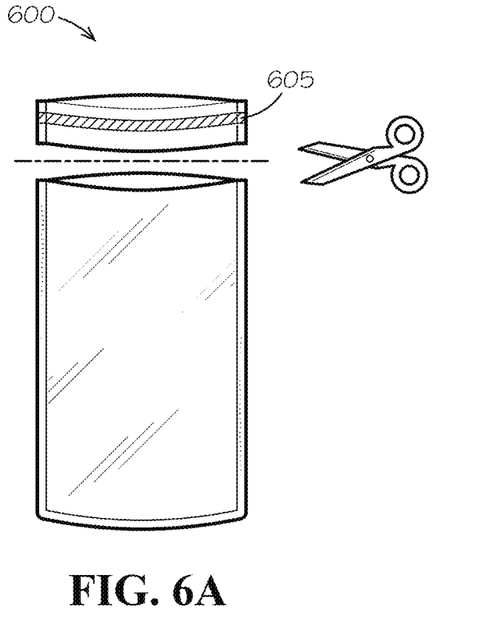
FIG. 6A, FIG. 6B, FIG. 6C, and FIG. 6D shows exemplary embodiments of a thermally conductive envelope.

FIG. 6A, FIG. 6B, FIG. 6C, and FIG. 6D show exemplary embodiments of a thermally conductive envelope. As shown in FIG. 6A, a thermally conductive envelope 600 includes a heat seal 605. For example, the heat seal 605 may be fully closed after receiving a content for lyophilization (e.g., the SPC 415). At the pre-lyophilization processor 210, the heat seal 605 may prevent the SPC 415 from, for example, falling out of the thermal conductive envelope 600 during the mechanical process 230 as described with reference to FIG. 2. In the lyophilization process, in this example, the thermal conductive envelope 600 is cut open (e.g., partially or entirely) to allow water vapor to escape during sublimation. In some examples, to allow the water vapor to escape, the thermal conductive envelope 600 may also be cut at a corner diagonally. In some examples, holes may be poked on the conductive envelope 600 to allow water vapor to escape.

Figure 6B:
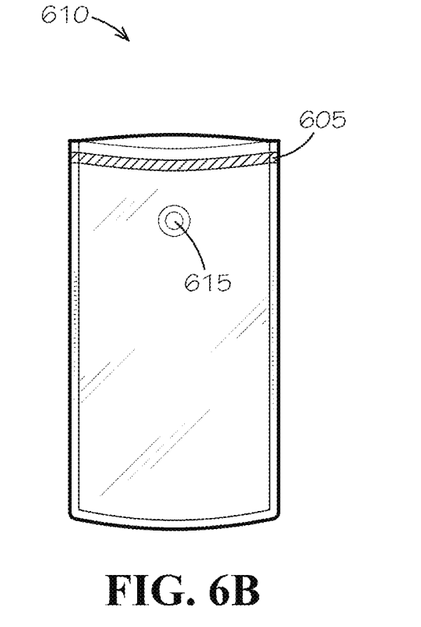

As shown in FIG. 6B, a thermally conductive envelope 610 includes a valve 615. For example, the valve 615 may be one-way water vapor permeable for releasing water vapor from the thermally conductive envelope 610 during sublimation. In some implementations, the valve 615 may be pressure-activated. For example, the valve 615 may be impermeable to the SPC 415 and water in liquid form. In some implementations, the valve 615 may be impermeable to water vapor when a pressure differential between an inside and an outside of the thermally conductive envelope 610 is less than a predetermined threshold. During sublimation, as the temperature within the thermally conductive envelope 610 increases, the valve 615 may become water vapor permeable due to the pressure differential being above the predetermined threshold.

Figure 6C:
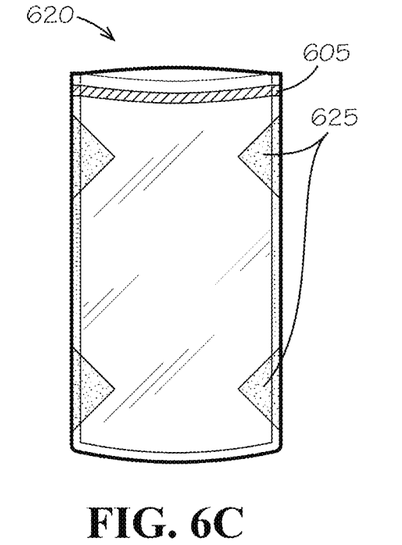

As shown in FIG. 6C, a thermally conductive envelope 620 includes multiple pressure sensitive degassing panels 625. For example, the pressure sensitive degassing panels 625 may be activated when a pressure differential between an inside and an outside of the thermally conductive envelope 620 is higher than a predetermined threshold. For example, water vapors may escape from the thermally conductive envelope 620 when the pressure sensitive degassing panels 625 are activated.

Figure 6D:
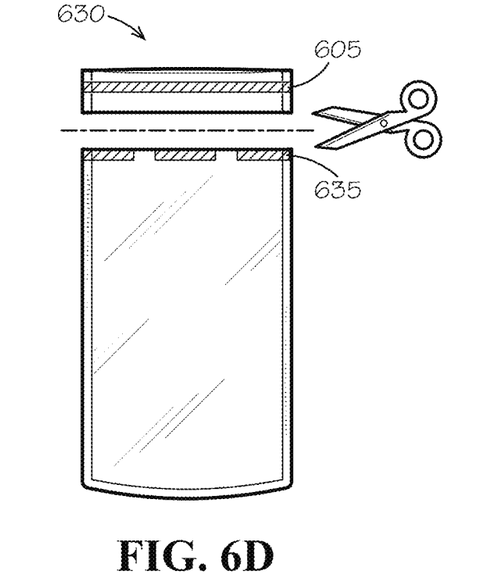

As shown in FIG. 6D, a thermally conductive envelope 630 includes a secondary venting heat seal 635. In some implementations, the secondary venting heat seal 635 may include very small (e.g., 1-100 nm wide) venting channels. In some examples, water vapor molecules may escape from the thermally conductive envelope 630 through the venting channels during sublimation.

Figure 7A:
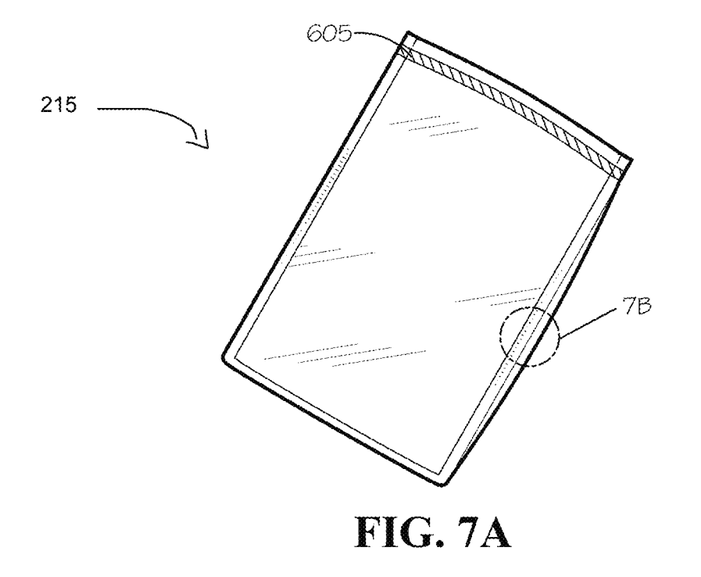
FIG. 7A and FIG. 7B show an exemplary thermally conductive envelope having a thermally conductive and vapor permeable layer.
Figure 7B:
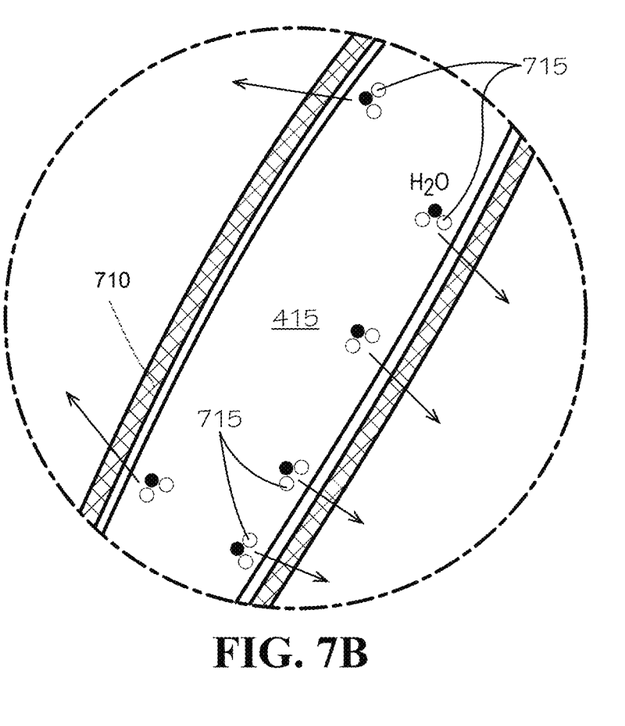

FIG. 7A and FIG. 7B show an exemplary thermally conductive envelope 215 having a thermally conductive and vapor permeable layer. As shown in FIG. 7A, the thermally conductive envelope 215 contains the SPC 415 (as shown in FIG. 7B) sealingly enclosed by the heat seal 605. In a close-up view as shown in FIG. 7B, the thermally conductive envelope 215 includes a thermally conductive vapor permeable layer 710. For example, the thermally conductive vapor permeable layer 710 may allow water vapor 715 to escape when a pressure differential between an inside and an outside of the thermally conductive envelope 215 exceeds a predetermined threshold. In some implementations, the thermally conductive vapor permeable layer 710 may be thermally activated. For example, the thermally conductive vapor permeable layer 710 may be permeable to water vapor when a temperature of the thermally conductive vapor permeable layer 710 exceeds a predetermined temperature threshold. For example, the thermally conductive vapor permeable layer 710 may include an organic structure (e.g., a protein) that may change shape based on temperature. For example, the organic structure may have varied permissively based on temperature.

In some implementations, the thermally conductive vapor permeable layer 710 may include a nano meander spring structure. For example, the nano meander spring structure may expand when temperature increases to allow water vapor to escape from the thermally conductive envelope 215.

In some implementations, by way of example and not limitation, the thermally conductive vapor permeable layer 710 may include one or more portions (e.g., thermally conductive, non thermally conductive) of environmentally responsive membrane (e.g., temperature and/or pressure sensitive membrane). The membrane may, for example, include polymer membranes. The material may be selected, prepared, and/or otherwise configured, for example, to have temperature and/or pressure sensitive permeability. For example, the material may be constructed to have an overall permeability below a first permeability threshold (e.g., substantially 'non-permeable') at or below a first temperature threshold (e.g., freezing temperatures). The material may, for example, be constructed to have an overall permeability above a second permeability threshold (e.g., 'permeable' at or above a second temperature threshold (e.g., temperatures experienced by the membrane during off-gassing phases of lyophilization). Some implementations may, for example, be graft-polymerized (e.g., plasma-induced, radiation co-grafting). Some implementations may, for example, be UV photopolymerized.

In some implementations, by way of example and not limitation, the membrane may be constructed in layers (e.g., thermally conductive sub-layer such as with a pattern of fenestrations, temperature and/or pressure sensitive vapor permeable membrane).

In some implementations, by way of example and not limitation, the membrane may be a composite. For example, an environmentally-responsive material may be intermingled with a thermally conductive material. For example, thermally conductive carbon-fiber polymers (e.g., carbon nanotubes) may be included. Metallic strands and/or particles may, for example, be included. In some implementations, the dynamically-permeable membrane component(s) and the thermally-conductive component(s) may, for example, be interwoven. In some implementations, the dynamically-permeable membrane component(s) and the thermally-conductive component(s) may, for example, be felted (e.g., amorphously and/or anisotropically arranged). In some implementations, the dynamically-permeable membrane component(s) and the thermally-conductive component(s) may, for example, be mixed together during polymerization.

In an illustrative aspect, a method for lyophilizing a solid phase lactose-based composition may include receive a quantity of a solid phase lactose-based composition (SPLBC) in a frozen state in a first packaging. The method may include, while maintaining the SPLBC in the frozen state, a) transfer the SPLBC into a second packaging, wherein the second packaging includes: an outer layer including a thermally conductive layer encompassing at least 80 percent of a total surface area of the SPLBC, and an inner layer including a food-safe layer that is sterile to safely contact food products; b) mechanically distribute the SPLBC into a block having at least one homogenous dimension, wherein the block includes a predetermined maximum thickness between two heating surfaces of the block; c) provide, in a lyophilization process, a heat source configured to communicate substantially all thermal energy to the SPLBC via the thermally conductive layer, such that the SPLBC is lyophilized substantially uniformly at the heating surfaces while the heating surfaces are maintained in a substantially frozen state; and, d) transfer the lyophilized SPLBC to a third packaging for shipment. In each step of the method, physical contacts with the SPLBC are limited to the first packaging, the second packaging, and the third packaging.

The method may include provide at least two different sizes of the second packaging; and,
  select between the at least two different sizes of the second packaging for transferring the SPLBC based on a volume of the received SPLBC.

The food-safe layer may include a material approved by the U.S. Food and Drug Administration for contacting a lactose-based food product.

The second packaging may include a gas permeable component configured to release water vapor generated during the lyophilization process.

The gas permeable component may include a one-way gas valve configured such that, when a pressure differential between an inside and an outside of the second packaging exceeds a predetermined threshold, gases within the second packaging are releases from the inside of the second packaging via the one-way gas valve.

The gas permeable component may include at least one degassing panel configured such that: in an inactive mode, the at least one degassing panel is water vapor impermeable, and, in an active mode, the at least one degassing panel is water vapor permeable. The at least one degassing panel may be activated when at least one comparison between a predetermined environmental attribute inside the packaging and a corresponding environmental attribute outside the packaging meets at least one predetermined environmental criterion. The thermally conductive layer may include the at least one degassing panel.

The second packaging may include a venting heat-seal. The SPLBC may be sealingly enclosed within the second packaging. The second packaging may be configured to permit water vapor to escape from the second packaging during the lyophilization process.

The SPLBC may include frozen human breast milk.

In an illustrative aspect, a method for lyophilizing a solid phase composition may include receive a quantity of a solid phase composition (SPC) in a frozen state in a first packaging. The method may include, while maintaining the SPC in the frozen state: a) transfer the SPC into a second packaging including a thermally conductive layer encompassing at least 80 percent of a total surface area of the SPC; b) mechanically distribute the SPC into a block having at least one homogenous dimension, wherein the block includes a predetermined maximum thickness between two heating surfaces the block; and, c) provide, in a lyophilization process, a heat source configured to communicate substantially all thermal energy to the SPC via the thermally conductive layer, such that the SPC is lyophilized substantially uniformly while being maintained in a substantially frozen state.

The method may include provide at least two different sizes of the second packaging. The method may include select the at least two different sizes of the second packaging for transferring the SPC based on a volume of the received SPC.

The method may include transfer the lyophilized SPC to a third packaging for shipment,
wherein, in each step of the method, physical contact with the SPC is limited to the first packaging, the second packaging, and the third packaging.

The second packaging may include: an outer layer including the thermally conductive layer; and, an inner layer including a food-safe layer that is sterile to safely contact food products.

The food-safe layer may include a material approved by the U.S. Food and Drug Administration for contacting a lactose-based food product.

The second packaging may include a gas permeable component configured to release water vapor generated during the lyophilization process.

The gas permeable component may include a one-way gas valve configured such that, when a pressure differential between an inside and an outside of the second packaging exceeds a predetermined threshold, gases within the second packaging are released from the inside of the second packaging via the one-way gas valve. The gas permeable component may include at least one degassing panel configured such that: in an inactive mode, the at least one degassing panel is water vapor impermeable, and, in an active mode, the at least one degassing panel is water vapor permeable. The at least one degassing panel may be activated when at least one comparison between a predetermined environmental attribute inside the packaging and a corresponding environmental attribute outside the packaging meets at least one predetermined environmental criterion. The thermally conductive layer may include the at least one degassing panel.

The second packaging may include a venting heat-seal. The SPC may be sealingly enclosed within the second packaging. The second packaging may be configured to permit water vapor to escape from the second packaging during the lyophilization process.

The SPC may include frozen breast milk.

Although various embodiments have been described with reference to the figures, other embodiments are possible. In some implementations, the SPC may be disposed in the freeze-dryer 235 at a slight angle from horizontal, with the opening of the envelope positioned to be above an opposite end. In some implementations, multiple predetermined block sizes may be selected. For example, the different block sizes may advantageously be selected based on energy efficiency and delivery time requirements of the lyophilization process. In some implementations, the processing facility 115 may advantageously preserve a contact-free process such that the thermally solid fluid is never contacted by a human and/or a machine. In some implementations, the processing facility 115 may advantageously maintain frozen fluid received in one parcel separate from other parcels of frozen fluid processed in a same batch.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. A method for lyophilizing a solid phase lactose-based composition (SPLBC), the method comprising:
   receiving a quantity of the SPLBC in a frozen state in a first packaging; and,
   while maintaining the SPLBC in the frozen state:
   a) providing at least two different sizes of a second packaging; and, selecting between the at least two different sizes of the second packaging based on the volume of the received SPLBC;
   b) transferring the SPLBC by removing the SPLBC from the first packaging into the second packaging, wherein the second packaging comprises:
      an inner layer comprising a food-safe layer that is configured to contact the SPLBC;
      a layer exterior to the inner layer comprising a thermally conductive layer encompassing at least 80 percent of a total surface area of the SPLBC; and,
   c) mechanically distributing the SPLBC, while in the second packaging, into a block having at least one homogenous dimension such that the SPLBC remains isolated by the second packaging from processing equipment and workers, wherein the block comprises a predetermined maximum thickness between two heating surfaces of the block;
   d) providing, in a lyophilization process, a heat source configured to communicate thermal energy to the SPLBC via the thermally conductive layer, such that the SPLBC is lyophilized substantially uniformly and,
   e) transferring the lyophilized SPLBC to a third packaging for shipment, wherein, in each step of the method, solid phase physical contacts with the SPLBC are limited to the first packaging, the second packaging, and the third packaging.

2. A method for lyophilizing a solid phase composition (SPC), the method comprising:
   receiving a quantity of the SPC in a frozen state in a first packaging; and,
   while maintaining the SPC in the frozen state:
   a) providing at least two different sizes of a second packaging; and, selecting between the at least two different sizes of the second packaging based on the volume of the received SPC;
   b) transferring the SPC by removing the SPC from the first packaging into a second packaging comprising a thermally conductive layer encompassing at least 80 percent of a total surface area of the SPC;
   c) mechanically distributing the SPC, while in the second packaging, into a block having at least one homogenous dimension such that the SPC remains isolated by the second packaging, wherein the block comprises a predetermined maximum thickness; and,
   d) providing, in a lyophilization process, a heat source configured to communicate thermal energy to the SPC via the thermally conductive layer, such that the SPC is lyophilized substantially uniformly.

3. The method for lyophilizing the SPC of claim 2, further comprising transferring the lyophilized SPC to a third packaging for shipment,
wherein, in each step of the method, solid phase physical contact with the SPC
is limited to the first packaging, the second packaging, and the third packaging.

4. The method for lyophilizing the SPC of claim 2, wherein the second packaging further comprises:
an inner layer comprising a food-safe layer; and wherein the thermally conductive layer comprises a layer exterior to the inner layer.

5. The method for lyophilizing the SPC of claim 4, wherein the food-safe layer comprises a material approved by the U.S. Food and Drug Administration for contacting a lactose-based food product.

6. The method for lyophilizing the SPC of claim 2, wherein the second packaging further comprises a gas permeable component configured to release water vapor generated during the lyophilization process.

7. The method for lyophilizing the SPC of claim 6, wherein the gas permeable component comprises a one-way gas valve configured such that, when a pressure differential between an inside and an outside of the second packaging exceeds a predetermined threshold, gases within the second packaging are released from the inside of the second packaging via the one-way gas valve.

8. The method for lyophilizing the SPC of claim 6, wherein the gas permeable component comprises at least one degassing panel configured such that:
in an inactive mode, the at least one degassing panel is water vapor impermeable, and,
in an active mode, the at least one degassing panel is water vapor permeable,
wherein the at least one degassing panel is activated when a predetermined environmental attribute inside the packaging and a corresponding environmental attribute outside the packaging meets at least one predetermined environmental criterion.

9. The method for lyophilizing the SPC of claim 8, wherein the thermally conductive layer comprises the at least one degassing panel.

10. The method for lyophilizing the SPC of claim 2, wherein:
the second packaging further comprises a venting heat-seal,
the SPC is enclosed within the second packaging, and
the second packaging is configured to permit water vapor to escape from the second packaging during the lyophilization process.

11. The method for lyophilizing the SPC of claim 2, wherein the SPC comprises frozen breast milk.

12. A method for lyophilizing a solid phase composition (SPC), the method comprising:
receiving a quantity of the SPC in a frozen state in a first packaging; providing at least two different sizes of a lyophilization packaging; selecting between the at least two different sizes of the lyophilization packaging based on the volume of the received SPC; and,
while maintaining the SPC in the frozen state: a) transferring the SPC by removing the SPC from the first packaging into the lyophilization packaging;
wherein the lyophilization packaging comprises a thermally conductive layer encompassing at least 80 percent of a total surface area of the SPC;

b) mechanically distributing the SPC, while in the lyophilization packaging, into a block having at least one homogenous dimension such that the SPC remains isolated by the lyophilization packaging, wherein the block comprises a predetermined maximum thickness between two heating surfaces of the block; and,
c) providing, in a lyophilization process, a heat source configured to communicate thermal energy to the SPC via the thermally conductive layer of the lyophilization packaging, such that the SPC is lyophilized substantially uniformly.

13. The method for lyophilizing the SPC of claim 12, further comprising:
providing at least two different sizes of the lyophilization packaging; and,
selecting between the at least two different sizes of the lyophilization packaging for transferring the SPC based on a volume of the received SPC.

14. The method for lyophilizing the SPC of claim 13, further comprising transferring the lyophilized SPC to a third packaging for shipment,
wherein, in each step of the method, solid phase physical contact with the SPC is limited to the first packaging, the lyophilization packaging, and the third packaging.

15. The method for lyophilizing the SPC of claim 12, wherein the lyophilization packaging further comprises:
an inner layer comprising a food-safe layer; and wherein the thermally conductive layer comprises a layer exterior to the inner layer.

16. The method for lyophilizing the SPC of claim 15, wherein the food-safe layer comprises a material approved by the U.S. Food and Drug Administration for contacting a lactose-based food product.

17. The method for lyophilizing the SPC of claim 12, wherein the lyophilization packaging further comprises a gas permeable component configured to release water vapor generated during the lyophilization process.

18. The method for lyophilizing the SPC of claim 17, wherein the gas permeable component comprises a one-way gas valve configured such that, when a pressure differential between an inside and an outside of the lyophilization packaging exceeds a predetermined threshold, gases within the lyophilization packaging are released from the inside of the lyophilization packaging via the one-way gas valve.

19. The method for lyophilizing the SPC of claim 17, wherein the gas permeable component comprises at least one degassing panel configured such that:
in an inactive mode, the at least one degassing panel is water vapor impermeable, and,
in an active mode, the at least one degassing panel is water vapor permeable,
wherein the at least one degassing panel is activated when a predetermined environmental attribute inside the packaging and a corresponding environmental attribute outside the packaging meets at least one predetermined environmental criterion.

20. The method for lyophilizing the SPC of claim 19, wherein the thermally conductive layer comprises the at least one degassing panel.

21. The method for lyophilizing the SPC of claim 12, wherein:
the lyophilization packaging further comprises a venting heat-seal,
the SPC is enclosed within the lyophilization packaging, and the lyophilization packaging is configured to permit water vapor to escape from the lyophilization packaging during the lyophilization process.

22. The method for lyophilizing the SPC of claim 12, wherein the SPC comprises frozen breast milk.

\* \* \* \* \*